(12) United States Patent
Watanabe (10) Patent No.: US 11,663,714 B2
(45) Date of Patent: May 30, 2023

(54) IMAGE PROCESSING APPARATUS, IMAGE PROCESSING METHOD, AND PROGRAM

(71) Applicant: Sony Corporation, Tokyo (JP)

(72) Inventor: Shinji Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 16/955,970

(22) PCT Filed: Nov. 22, 2018

(86) PCT No.: PCT/JP2018/043092
§ 371 (c)(1),
(2) Date: Jun. 19, 2020

(87) PCT Pub. No.: WO2019/130921
PCT Pub. Date: Jul. 4, 2019

(65) Prior Publication Data
US 2021/0019862 A1    Jan. 21, 2021

(30) Foreign Application Priority Data

Dec. 17, 2017 (JP) .............................. JP2017-250534

(51) Int. Cl.
*G06T 9/40* (2006.01)
*G06T 3/40* (2006.01)
(Continued)

(52) U.S. Cl.
CPC .......... *G06T 3/4023* (2013.01); *G06K 9/6234* (2013.01); *G06K 9/6256* (2013.01);
(Continued)

(58) Field of Classification Search
CPC ....... G06T 3/4023; G06T 5/40; G06T 7/0012; G06T 2207/30024; G06V 10/758; G06K 9/6234; G06K 9/6256
See application file for complete search history.

(56) References Cited

U.S. PATENT DOCUMENTS 5,083,860 A * 1/1992 Miyatake ............... H04N 5/147
  352/38
6,037,982 A * 3/2000 Coelho ................ H04N 19/192
  375/E7.145

(Continued)

FOREIGN PATENT DOCUMENTS

| JP | 2006-245940 A | 9/2006 |
| JP | 2008-190872 A | 8/2008 |
| JP | 2016-053763 A | 4/2016 |

OTHER PUBLICATIONS

Lee et al., 2016, "Streamlining the Histogram Equalization of Digital Images by Using Decimation Approach" (pp. 482-485) (Year: 2016).*

(Continued)

*Primary Examiner* — Manav Seth
(74) *Attorney, Agent, or Firm* — Wolf, Greenfield & Sacks, P.C.

(57) ABSTRACT

[Problem] To shorten the processing time without performing complicated processing during image reading.
[Solution] The present disclosure provides an image processing apparatus that includes: a dividing unit that divides a detection region for detecting a feature value of an image into a plurality of regions; a decimation processing unit that performs a decimation process on a pixel value for each of the regions; and a histogram calculating unit that interpolates a pixel value having undergone the decimation process to calculate a histogram of pixel values of the regions. With this configuration, it is possible to shorten the processing time without performing complicated processing during image reading.

11 Claims, 6 Drawing Sheets

(51) Int. Cl.
  *G06K 9/62* (2022.01)
  *G06T 5/40* (2006.01)
  *G06T 7/00* (2017.01)
  *G06V 10/75* (2022.01)

(52) U.S. Cl.
  CPC .............. *G06T 5/40* (2013.01); *G06T 7/0012* (2013.01); *G06V 10/758* (2022.01); *G06T 2207/30024* (2013.01)

(56) References Cited

U.S. PATENT DOCUMENTS

| | | | | |
|---|---|---|---|---|
| 6,822,762 B2 * | 11/2004 | Moroney | ............. | G06T 5/20 358/1.9 |
| 6,853,736 B2 * | 2/2005 | Miyake | ............. | G06T 1/005 713/176 |
| 6,898,314 B2 * | 5/2005 | Kung | ............. | G06V 30/162 382/168 |
| 6,980,326 B2 * | 12/2005 | Tsuchiya | ............. | H04N 1/60 358/1.9 |
| 7,162,101 B2 * | 1/2007 | Itokawa | ............. | G06T 7/12 382/199 |
| 7,532,743 B2 * | 5/2009 | Morisada | ............. | G06V 40/161 382/165 |
| 7,826,659 B2 * | 11/2010 | Umeda | ............. | G06T 5/005 382/167 |
| 7,970,227 B2 * | 6/2011 | Saito | ............. | H04N 9/04557 382/254 |
| 8,121,348 B2 * | 2/2012 | Hayasaka | ............. | G06V 20/58 348/148 |
| 8,849,056 B2 * | 9/2014 | Wakazono | ............. | G06T 5/002 382/168 |
| 8,861,854 B2 * | 10/2014 | Shimazaki | ............. | G06V 10/28 382/181 |
| 8,983,182 B1 * | 3/2015 | Li | ............. | G06T 5/002 358/3.08 |
| 9,508,155 B2 * | 11/2016 | Muninder | ............. | G06V 40/161 |
| 9,569,831 B2 * | 2/2017 | Song | ............. | G06T 1/005 |
| 2009/0021695 A1 * | 1/2009 | Scarpino | ............. | A63B 22/18 351/210 |
| 2010/0220215 A1 * | 9/2010 | Rubinstein | ............. | H04N 19/44 348/E11.006 |
| 2011/0074973 A1 * | 3/2011 | Hayashi | ............. | H04N 5/23219 348/222.1 |
| 2022/0245919 A1 * | 8/2022 | Sano | ............. | G06V 10/255 |

OTHER PUBLICATIONS

International Search Report and English translation thereof dated Feb. 26, 2019 in connection with International Application No. PCT/JP2018/043092.

Yin et al., Cell Segmentation in Microscopy Imagery using a Bag of Local Bayesian Classifiers. 2010 IEEE International Symposium on Biomedical Imaging. pp. 125-128.

* cited by examiner

IMAGE PROCESSING APPARATUS, IMAGE PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2018/043092, filed in the Japanese Patent Office as a Receiving Office on Nov. 22, 2018, which claims priority to Japanese Patent Application Number JP2017-250534, filed in the Japanese Patent Office on Dec. 27, 2017, each of which is hereby incorporated by reference in its entirety.

FIELD

The present invention relates to an image processing apparatus, an image processing method, and a program.

BACKGROUND

For example, the following Patent Literature 1 describes the conventional technique in which it is assumed that the processing time is shortened when all of the characters are read from the image captured by a digital camera, or the like. Furthermore, the following Non Patent Literature 1 describes the segmentation of a microscopic image by using learning.

CITATION LIST

Patent Literature

Patent Literature 1: JP 2016-053763 A

Non Patent Literature

Non Patent Literature 1: ZhaozhengYin, Ryoma Bise, Mei Chen, Takeo Kanade, "CELL SEGMENTATION IN MICROSCOPYIMAGERY USING A BAG OF LOCAL BAYESIAN CLASSIFIERS" Rotterdam, Netherlands Apr. 14-17, 2010IEEE Press Piscataway, N.J., USA c2010 <URL: https://dl.acm.org/citation.cfm?id=1855995>

SUMMARY

Technical Problem

With the technique disclosed in the above Patent Literature 1, the process is performed to reduce the search range so as to shorten the processing time. Specifically, according to the technique disclosed in Patent Literature 1, the input image is not fully searched, and the region of interest is set so that the search is executed at two steps. This method has a problem in that the processing is complicated due to the step-by-step search.

Furthermore, in the field of medicine and life science, the observation on a change in the motion or the condition of many kinds of cells and body tissues has been executed recently. In order to achieve an objective evaluation of them, the technique for discriminating an event with regard to the living tissue has been under development. Particularly, when the living tissue moves sharply, it is necessary to read the image at high speed in real time. With the technique described in the above Patent Literature, the step-by-step search makes it difficult to read the image of the sharply moving living tissue, or the like, in real time.

Therefore, there is a demand for a reduction in the processing time without performing complicated processing during image reading.

Solution to Problem

According to the present disclosure, an image processing apparatus is provided that includes: a dividing unit that divides a detection region for detecting a feature value of an image into a plurality of regions; a decimation processing unit that performs a decimation process on a pixel value for each of the regions; and a histogram calculating unit that interpolates a pixel value having undergone the decimation process to calculate a histogram of pixel values of the regions.

Moreover, according to the present disclosure, an image processing method is provided that includes: dividing a detection region for detecting a feature value of an image into a plurality of regions; performing a decimation process on a pixel value for each of the regions; and interpolating a pixel value having undergone the decimation process to calculate a histogram of pixel values of the regions.

Moreover, according to the present disclosure, a program is provided that causes a computer to function as: a means that divides a detection region for detecting a feature value of an image into a plurality of regions; a means that performs a decimation process on a pixel value for each of the regions; and a means that interpolates a pixel value having undergone the decimation process to calculate a histogram of pixel values of the regions.

Advantageous Effects of Invention

As described above, according to the present disclosure, during image reading, it is possible to shorten the processing time without performing complicated processing.

Furthermore, there is no particular limitation on the above-described advantage and, in addition to the above advantage or instead of the above advantage, any advantage described in the description or other advantages, which may be recognized from the description, may be produced.

DESCRIPTION OF EMBODIMENTS

A preferred embodiment of the present disclosure is described below in detail with reference to the accompanying drawings. In the description and the drawings, the components having substantially the same functional configuration are denoted with the same reference numerals, and duplicated descriptions are omitted.

Figure 1:
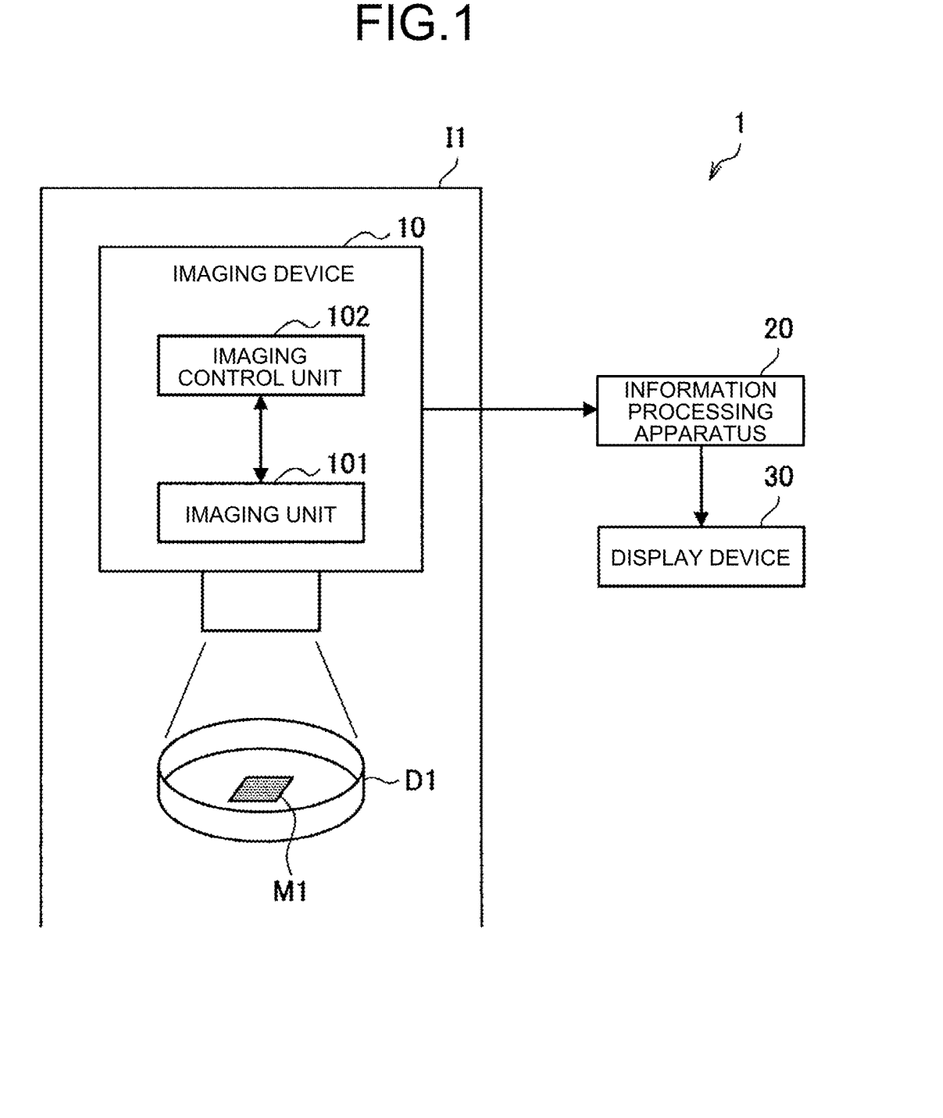
FIG. 1 is a diagram illustrating the outline of a configuration of a system according to an embodiment of the present disclosure.

The descriptions are given in the following order.
1. Example of system configuration
2. Process performed by a detection unit
   2. 1. Outline
   2. 2. Specific processing content
3. Flow of process performed in the present embodiment
4. Example of adaptation to application 1. Example of System Configuration FIG. 1 is a diagram illustrating the outline of a configuration of a system 1 according to an embodiment of the present disclosure. As illustrated in FIG. 1, the system 1 includes an imaging device 10, an information processing apparatus 20, and a display device 30. The imaging device 10, the information processing apparatus 20, and the display device 30 are connected to each other via various wired or wireless networks.

The imaging device 10 is a device that executes imaging to generate an image (still image or moving image). The imaging device 10 according to the present embodiment is implemented by using, for example, a digital camera. Alternatively, the imaging device 10 may be implemented by using any device having an imaging function, for example, a smartphone, a tablet, or a wearable device.

As illustrated in FIG. 1, the imaging device 10 according to the present embodiment is provided inside an incubator I1 and above an observation target M1 (cell or body tissue) inside a dish D1. Further, the imaging device 10 captures the observation target M1 at a predetermined frame rate to generate an image.

Furthermore, the imaging device 10 may be provided inside the incubator I1 or may be provided outside the incubator I1. Further, the imaging device 10 is also applicable to capturing of the observation target M1 that is not housed in the incubator I1. Moreover, the imaging device 10 may be provided integrally with the incubator I1.

More specifically, as illustrated in FIG. 1, the imaging device 10 according to the present embodiment includes an imaging unit 101 and an imaging control unit 102.

The imaging unit 101 includes various members such as an imaging element, e.g., a CCD (Charge Coupled Device) or a CMOS (Complementary Metal Oxide Semiconductor), a lens that controls the focus of an object image onto the imaging element, or a light source that irradiates the subject with light, with which the actual space is captured.

In order to properly determine the movement of the observation target M1, the imaging unit 101 according to the present embodiment captures a certain imaging region including the observation target M1. Furthermore, the imaging unit 101 may capture the observation target M1 directly (without using a different member such as a lens) or may capture the observation target M1 via a different member such as a microscope including an objective lens. In this case, to capture the movement of the observation target M1 in the order of submicron meters, it is preferable that the magnification of the objective lens is approximately 40 times to 60 times. Although the frame rate is not particularly limited, it is preferably set in accordance with the degree of change in the observation target, and specifically, it is preferably set to the frame rate at which the movement of the observation target M1 in the order of sub-second may be captured.

The signal generated by the imaging unit 101 during an imaging process is output to the imaging control unit 102.

The imaging control unit 102 includes a processing circuitry implemented by using a CPU (Central Processing Unit), a ROM (Read Only Memory), a RAM (Random Access Memory), or the like, and a communication device to control the overall operation of the imaging unit 101. For example, the imaging control unit 102 controls an imaging process by the imaging unit 101 and generates a captured image based on the signal obtained during the imaging process.

For example, the imaging control unit 102 may control the timing of the imaging process performed by the imaging unit 101. More specifically, the imaging control unit 102 may control the imaging unit 101 to continuously capture images during a predetermined period of time so as to generate a moving image. Furthermore, the imaging control unit 102 may control the imaging unit 101 so as to intermittently perform an imaging process (what is called time-lapse imaging) at a predetermined interval. Further, for example, to capture a plurality of embryos, the imaging control unit 102 may directly or indirectly control the incubator I1 so as to move the imaging device 10 or the dish in accordance with the imaging timing for the observation target M1, which is the target to be captured.

Furthermore, the imaging control unit 102 may control the wavelength, the irradiation intensity, or the irradiation time of the light source included in the imaging unit 101. For example, the imaging control unit 102 may control the light source of the imaging unit 101 so as to irradiate the observation target M1 with the light having the appropriate wavelength and the minimum irradiation intensity during only the period in which the imaging unit 101 performs the imaging process.

The imaging control unit 102 outputs the generated image, or the like, to the information processing apparatus 20.

The information processing apparatus 20 is an apparatus having an image analysis function using a learning function. The information processing apparatus 20 is implemented by using any device having an image analysis function, e.g., a PC (personal computer), a tablet, or a smartphone. The information processing apparatus 20 includes a processing circuitry such as a CPU (Central Processing Unit) and a communication device including the hardware that enables the wireless or wired communication. For example, in the information processing apparatus 20 according to the present embodiment, the communication device acquires images (e.g., a time-lapse image or a moving image) from the imaging device 10. Then, the information about each still image or moving image acquired by the processing circuitry is acquired, and the event for the observation target M1 is determined using each set of information. Each process performed by the processing circuitry of the information processing apparatus 20 is output to a storage device, a display device, or the like, provided inside or outside the information processing apparatus 20. Furthermore, the information processing apparatus 20 may be implemented by using one or more information processing apparatuses on a network. The functional configuration for performing each of the functions of the information processing apparatus 20 is described later.

Furthermore, according to the present embodiment, the imaging device 10, the information processing apparatus 20, and the display device 30 constitute the system 1; however, this technology is not limited to this example. For example, the imaging device 10 may perform a process (e.g., a dynamic analysis process, a feature value extraction process, each estimation process, or a determination process) regarding the information processing apparatus 20. In this case, the system 1 is implemented by using an imaging device having a dynamic analysis function, or the like.

Figure 2:
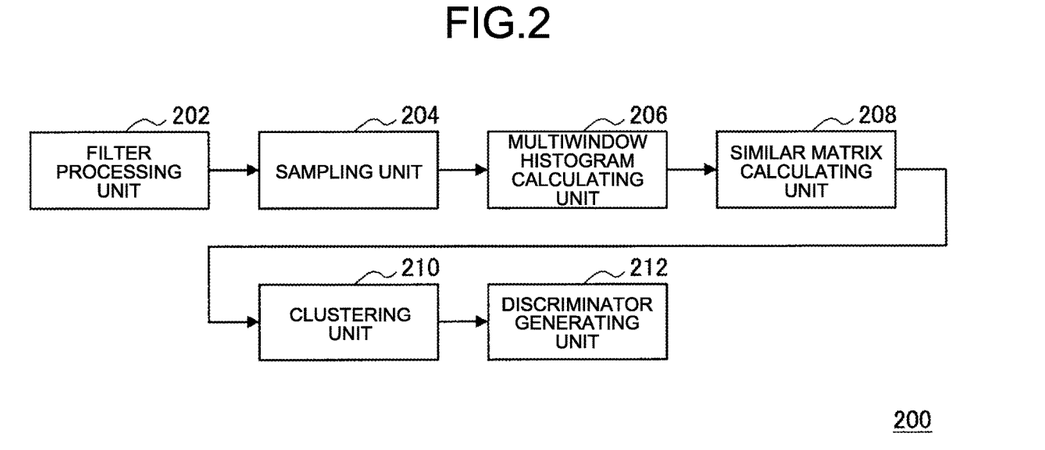
FIG. 2 is a schematic view illustrating an example of the configuration of a learning unit.

The information processing apparatus 20 may include the functions of a learning unit 200 and a detection unit 300. FIG. 2 is a schematic view illustrating an example of the configuration of the learning unit 200. The learning unit 200 receives the input of the same image as the observation target M1, executes clustering, and generates a discriminator. The learning unit 200 includes: a filter processing unit 202 that performs a filter process on an input image; a sampling unit 204 that samples an input image having undergone the filter process; a multiwindow histogram calculating unit 206 that calculates a multiwindow histogram; a similar matrix calculating unit 208; a clustering unit 210; and a learning coefficient deriving unit (discriminator generating unit) 212.

Examples of the observation target M1, which is the target according to the present embodiment, include a fast-moving cell (e.g., a sperm). When such a cell is captured by the imaging device 10 and presented on the display device 30, it is desirable to detect the image of the region of the cell from the background image at high speed and to display the movement in real time. However, if the detection of the region of the cell is time-consuming, the real-time display is disabled, and the sufficient observation of the cell including its movement is difficult. Therefore, according to the present embodiment, a high-processing load part of the detection algorithm is reduced so that the high-speed detection is enabled and the real-time cell observation is possible.

Furthermore, with regard to the learning side, basically, the existing algorithm disclosed in the above Non Patent Literature 1 may be used. Although the relearning by the learning unit 200 associated with the high-speed process at the detection side is not needed, the calculation of the multiwindow histogram that is similar to that at the detection side is incorporated at the time of learning. During the learning by the learning unit 200, after the filter processing unit 202 performs a filter process on the learning image, the sampling unit 204 samples a correct window and an incorrect window based on the correct data, and then the multiwindow histogram calculating unit 206 calculates a multiwindow histogram with regard to the correct window. Here, the histogram is calculated on all the pixels. After the calculation of the histogram is finished, the similar matrix calculating unit 208 calculates a similar matrix, the clustering unit 210 executes clustering, and after the learning coefficient is derived, the discriminator generating unit 212 generates a discriminator.

Figure 3:
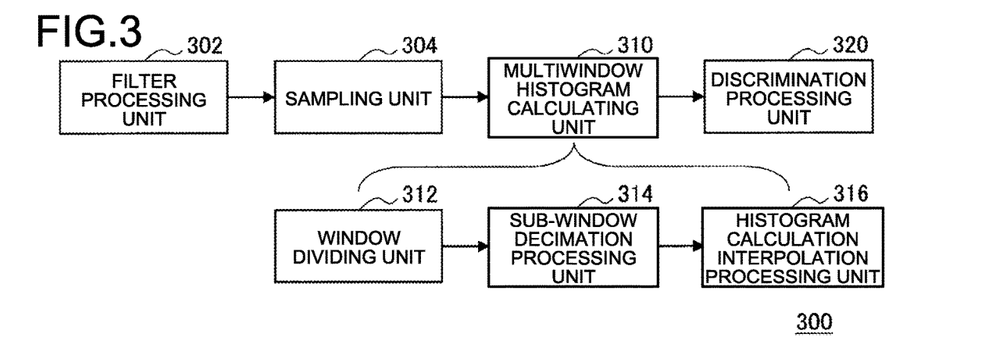
FIG. 3 is a schematic view illustrating an example of the configuration of a detection unit.

Furthermore, FIG. 3 is a schematic view illustrating an example of the configuration of the detection unit 300. The detection unit 300 includes a filter processing unit 302, a sampling unit 304, a multiwindow histogram calculating unit 310, and a discrimination processing unit 320. The multiwindow histogram calculating unit 310 includes a window dividing unit 312, a sub-window decimation processing unit 314, and a histogram calculation interpolation processing unit 316. Furthermore, the configurations of the learning unit 200 and the detection unit 300 illustrated in FIG. 2 and FIG. 3 may be configured by using a circuitry (hardware) or a processor such as a CPU and a program (software) for causing it to function.

Although the basic flow of the detection unit 300 is the same as that of the learning unit 200, the learning unit 200 and the detection unit 300 are different in the multiwindow histogram calculation part. As illustrated in FIG. 3, in the multiwindow histogram calculating unit 310, after the window division by the window dividing unit 312, the sub-window decimation process by the sub-window decimation processing unit 314 and the histogram interpolation process by the histogram calculation interpolation processing unit 316 are performed. In the multiwindow histogram calculating unit 310, the histogram calculation interpolation processing unit 316 interpolates the pixel values so as to calculate a histogram. The process of the multiwindow histogram calculating unit 310 is a part different from the learning unit 200, and this process reduces the load. The process performed by the detection unit 300 is described below in detail.

2. Process Performed by the Detection Unit 2. 1. Outline

According to the present embodiment, in order to reduce the calculation load during the local feature value calculation, the division of the window in an image during the local feature value calculation and the pixel decimation process during the histogram calculation in the window are combined so as to reduce the calculation load. A window may be set to any size, and a window may be further divided into regions. Furthermore, the pixel decimation rate may be also changed for each divided region. A histogram is calculated for each region of the window and is applied to a discriminant function. Moreover, the present embodiment is characterized in that the decimation is not executed during learning but is executed during the detection, and the value of the pixel corresponding to the decimated pixel is interpolated, whereby the calculation load is reduced while the detection accuracy is maintained.

A local feature value is an image expression technique, and the pattern recognition is executed by using the feature value. To find or discriminate an object included in an image, it is necessary to extract the feature corresponding to the object. One of the calculation algorithms for expressing a feature value is the generation of a local histogram. As a local histogram, for example, a histogram such as HOG (Histograms of Oriented Gradients) may be used.

To calculate a local feature value, the process is performed to divide the image into cells or divide the image into patches. Furthermore, to generate a discriminator using machine learning, the histogram of a window region in the image is calculated, and a discriminant function such as SVM (Support Vector Machine) is used.

The large part of the processing load of the object recognition or the region detection is the calculation of local feature values. Due to the development in the technology of the GPU and distributed processing, there has been much more developments in the performance than ever before. Furthermore, it is expected that the combination of a real-time process and other recognition processes for sounds, or the like, in a mobile device such as a smartphone is increasingly used in the future. Therefore, it is desirable to reduce the load on the calculation of local feature values as much as possible. One of the examples of a reduction in the processing load is changing the calculation algorithm for a feature value; however, relearning processing is needed for changing the algorithm. Therefore, the present embodiment uses a method for reducing the amount of processing calculation without executing relearning.

2. 2. Specific Processing Content

Figure 4:
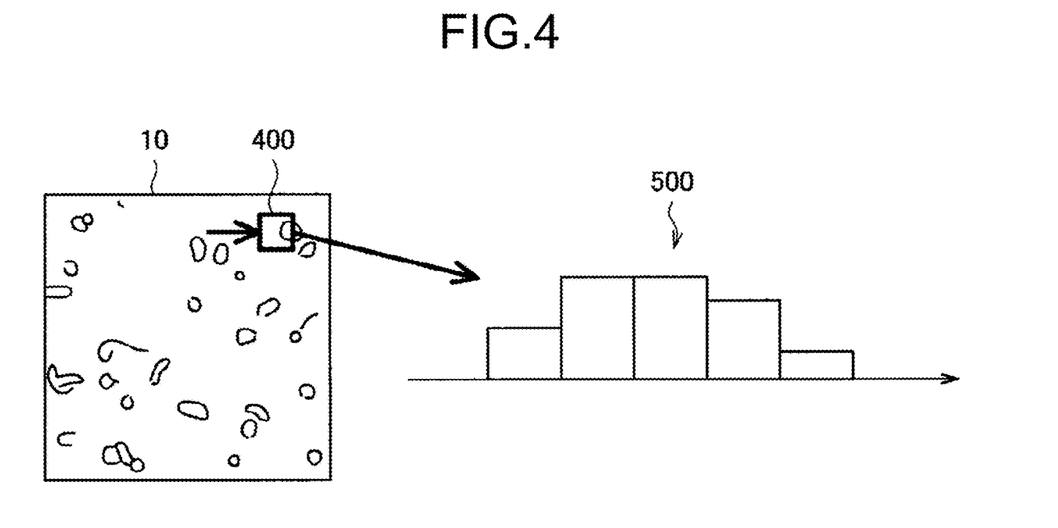
FIG. 4 is a schematic view illustrating the manner of detecting an image feature from an image.

FIG. 4 is a schematic view illustrating the manner of acquiring a histogram 500 representing an image feature from an image 10. According to the present embodiment, a window 400 for detecting the feature of the image 10 is prepared, and the feature in the window 400 is converted into the histogram 500. In the histogram 500, the vertical axis represents a frequency, and the horizontal axis represents, for example, a luminance value. The histogram 500 is obtained for each window so that an image feature may be detected for each of the windows 400.

To determine an image feature, the histogram of each image feature already acquired by learning is compared with the histogram 500 obtained from the window 400 of the image 10.

The unit of detection of the histogram 500 may be flexibly determined depending on an application. For example, in the case of an object detection application, an image is divided into cells that are equally spaced, and the histogram 500 of a cell (=window) is calculated. In the case of a segmentation application, the histogram 500 of the window 400 is extracted by one pixel to several pixels so that the image feature of each region may be detected, although the calculation load is accordingly increased.

According to the present embodiment, the window dividing unit 312 divides the window 400, and the sub-window decimation processing unit 314 executes pixel decimation, whereby the calculation cost during the detection of an image feature is reduced. Particularly, the present embodiment is most effective in a region detection process for determining the presence or absence of an object at the center of the window 400.

Figure 5:
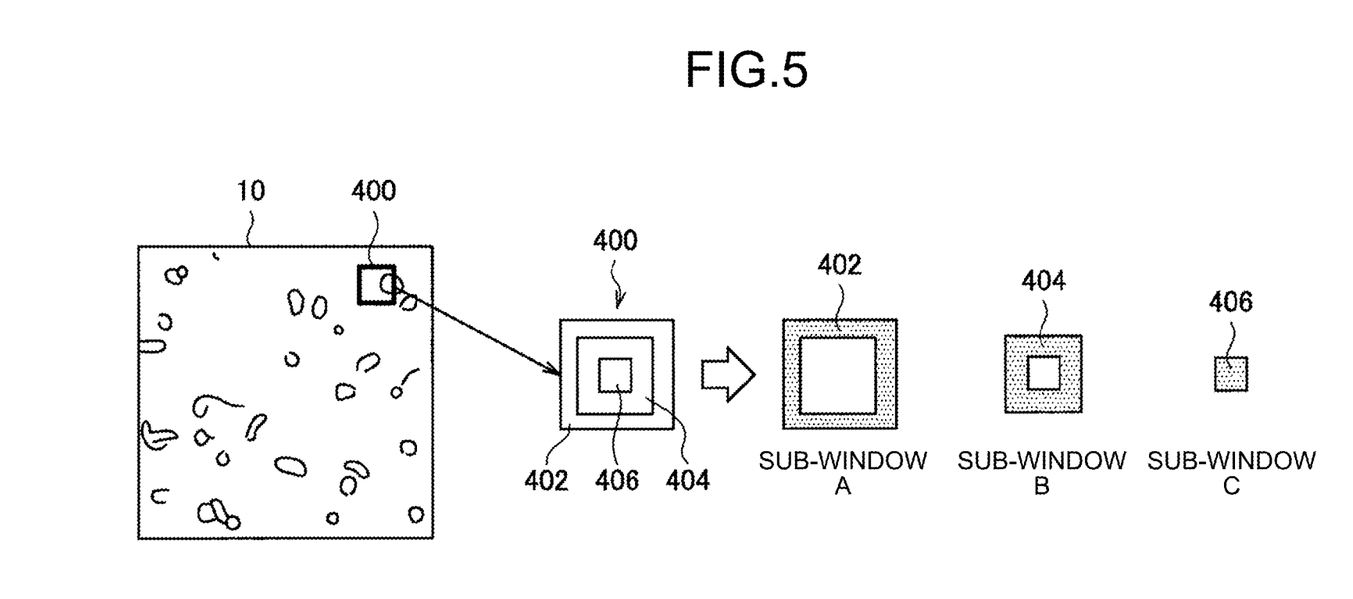
FIG. 5 is a schematic view illustrating a method for dividing a window.

FIG. 5 is a schematic view illustrating a method for dividing the window 400. In the example of FIG. 2, the window 400 is divided into three regions, i.e., a sub-window 402, a sub-window 404, and a sub-window 406. The sub-window 402 is the outermost region of the window 400, the sub-window 406 is the region near the center of the window 400, and the sub-window 404 is the intermediate region between the sub-window 402 and the sub-window 406. Furthermore, it is desirable that the method for dividing the window 400 conforms with that for the learning. That is, the multiwindow histogram calculating unit 206 of the learning unit 200 calculates the histogram based on the division of the window that is the same as that for the multiwindow calculating unit 310 of the detection unit 300. Moreover, at the learning side, a histogram is calculated by using all the pixels without executing the pixel decimation. Thus, it is unnecessary to execute relearning on the learning side.

With regard to each of the windows 400, it is determined whether an object such as a cell is present, and it is presented on the display device 30. Thus, an object such as a cell may be observed on the screen of the display device 30. For example, when it is determined whether the central pixel of the window 400 is an object such as a cell, the most important window for determining the existence probability of an object is the sub-window 406 located at the center of the window 400.

Figure 6:
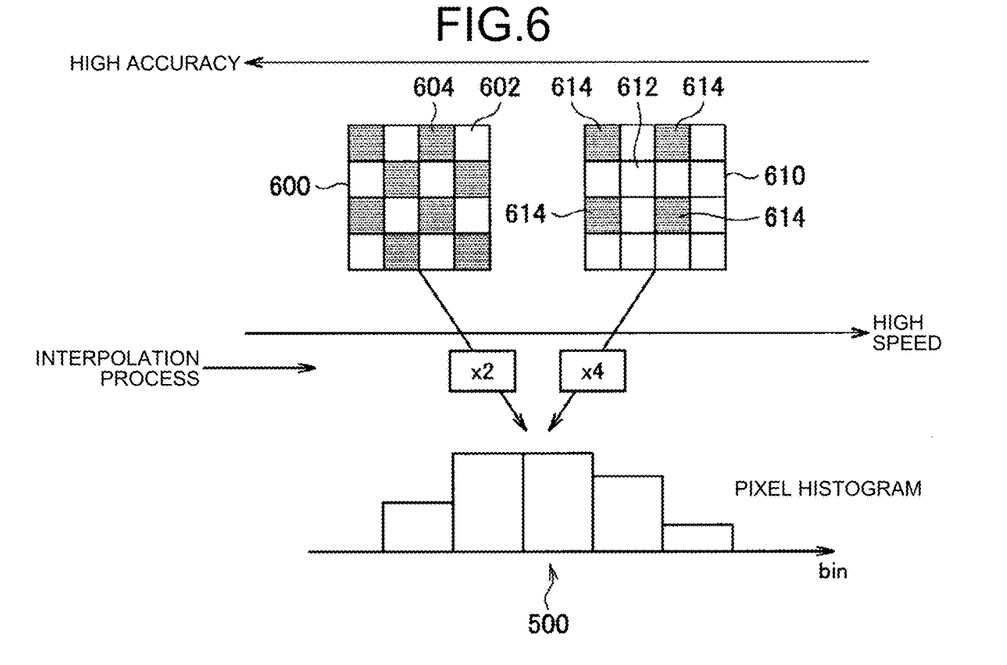
FIG. 6 is a schematic view illustrating a pixel decimation pattern of a window of 4×4 pixels.

The sub-window decimation processing unit 314 performs a decimation process on each of the sub-window 402, the sub-window 404, and the sub-window 406, which have been divided. FIG. 6 is a schematic view illustrating a pixel decimation pattern of the window of 4×4 pixels. A pixel decimation pattern 600 illustrated in FIG. 6 illustrates the case of a zigzag decimation pattern, and white pixels having no dots are decimated. The decimated pixels are not reflected in the histogram 500. In the case of a zigzag decimation pattern such as the pixel decimation pattern 600, the frequency of the histogram 500 is ½ of that in the case of no decimation.

Further, a pixel decimation pattern 610 illustrated in FIG. 6 illustrates the case where the pixels are decimated to be ¼. The decimation process may reduce the calculation load on the generation of the histogram 500 and further increase the speed of the histogram calculation.

In the case of a zigzag decimation pattern such as the pixel decimation pattern 600, the frequency of the histogram 500 is ½ of that in the case of no decimation. Therefore, the frequency is doubled to interpolate the value of the histogram 500. Furthermore, when the pixels are decimated by ¼ as illustrated in a pixel decimation pattern 610, the value of the histogram 500 is interpolated so that the frequency is quadrupled. Thus, the pixel values of the decimated pixels are interpolated so as to conform with the number of sets of data on the pixels used during the learning. This interpolation process eliminates the need for the relearning by the learning unit 200.

The method for the interpolation process is not particularly limited; for example, in the case of the pixel decimation pattern 600 that is a zigzag decimation pattern illustrated in FIG. 6, the pixel value of a decimated pixel 602 is interpolated with the pixel value of an immediate left pixel 604 which has not been decimated. Furthermore, in the case of the pixel decimation pattern 610, the pixel value of a decimated pixel 612 is interpolated with the average value of the pixel values of four neighboring pixels 614 which have not been decimated. Moreover, it is desirable that the pixel used for interpolation is the one located at a close distance from the center of the pixel to be interpolated; however, there is no particular limitation as long as a pixel is located in the vicinity as there is a subtle difference. This interpolation process is performed by the histogram calculation interpolation processing unit 316.

According to the present embodiment, the combination of the division of the window 400 and the pixel decimation achieves a further speeding-up process. As described above, when it is determined whether the central pixel of the window 400 is an object such as a cell, the most important window for determining the existence probability of an object is the sub-window 406 located at the center of the window 400. Therefore, as an outer window has a lower contribution rate for the existence probability of an object at the center of the window, an outer window among the divided windows has a higher decimation rate for the pixel decimation. This makes it possible to greatly reduce the processing load on the generation of the histogram 500 and to perform a speeding-up process.

After the histogram 500 is acquired, the image in the window may be discriminated based on the shape of the histogram 500. The discrimination processing unit 320 of the detection unit 300 uses the discriminator generated by the discriminator generating unit 212 of the learning unit 200 to discriminate the image of the region in the window. The discriminator has a database of image arrays clustered in accordance with a histogram of a learning image. Therefore, the histogram 500 is applied to the discriminator so that the image of the region in the window may be discriminated. Thus, it is possible to make a discrimination as to whether a region in the window is, for example, a cell, a living tissue, or a background.

3. Flow of Process Performed in the Present Embodiment

Figure 7:
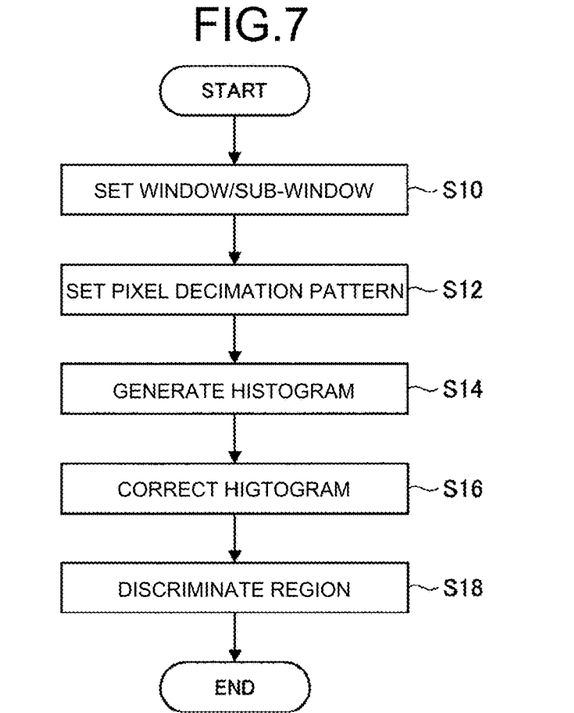
FIG. 7 is a flowchart illustrating a process by the system according to the present embodiment.

FIG. 7 is a flowchart illustrating a process by the system 1 according to the present embodiment. First, at Step S10, the window 400 and the sub-windows 402, 404, and 406 are set for an input image. Here, the window 400 is divided into the sub-windows 402, 404, and 406 by the window dividing unit 312, and the obtained sub-windows 402, 404, and 406 are extracted. Furthermore, as the input image, it is possible to use the one to which the filter processing unit 302 has applied a filter process (edge detection, circle detection, or the like).

At the subsequent Step S12, a pixel decimation pattern is set. Here, a pixel decimation pattern is set for each of the sub-windows 402, 404, and 406. A pixel decimation pattern is set such that an outer side of the window 400 has a higher decimation rate for the pixel decimation, as described above.

At the subsequent Step S14, the histogram 500 illustrated in FIG. 4 is generated based on the information obtained from each of the sub-windows 402, 404, and 406. A decimation pattern is applied to each of the set sub-windows, and the histogram 500 is generated for each sub-window.

At the subsequent Step S16, the histogram 500 is corrected. Here, the above-described interpolation process is performed on each of the sub-windows 402, 404, and 406, and the histogram 500 is corrected by using the obtained pixel values. The interpolation is executed by using the data on the adjacent pixels corresponding to the number of pixels to be interpolated in accordance with the decimation pattern. The operations at Step S14 and Step S16 may be performed simultaneously.

At the subsequent Step S18, the image of the region is discriminated. Here, the discriminator generated by the learning unit 200 is used, and the discrimination processing unit 320 applies the discriminator to the histogram 500 to discriminate the image of the region in the window 400. Thus, the determination on the feature of the image is made, including the determination as to whether the image in the window 400 is an object or a background.

4. Example of Adaptation to Application

It is expected that, for the capturing and the analysis of cells for which real-time performance is required, there is an increasing need for changing the capture speed in accordance with the magnitude of the movement of a cell in the future. Here, the capture speed is the interval of time to acquire the image of an object, and a shorter interval causes a higher capture speed. For the real-time detection in the case of an increase in the capture speed, an increase in the speed of the detection process is expected.

Figure 8:
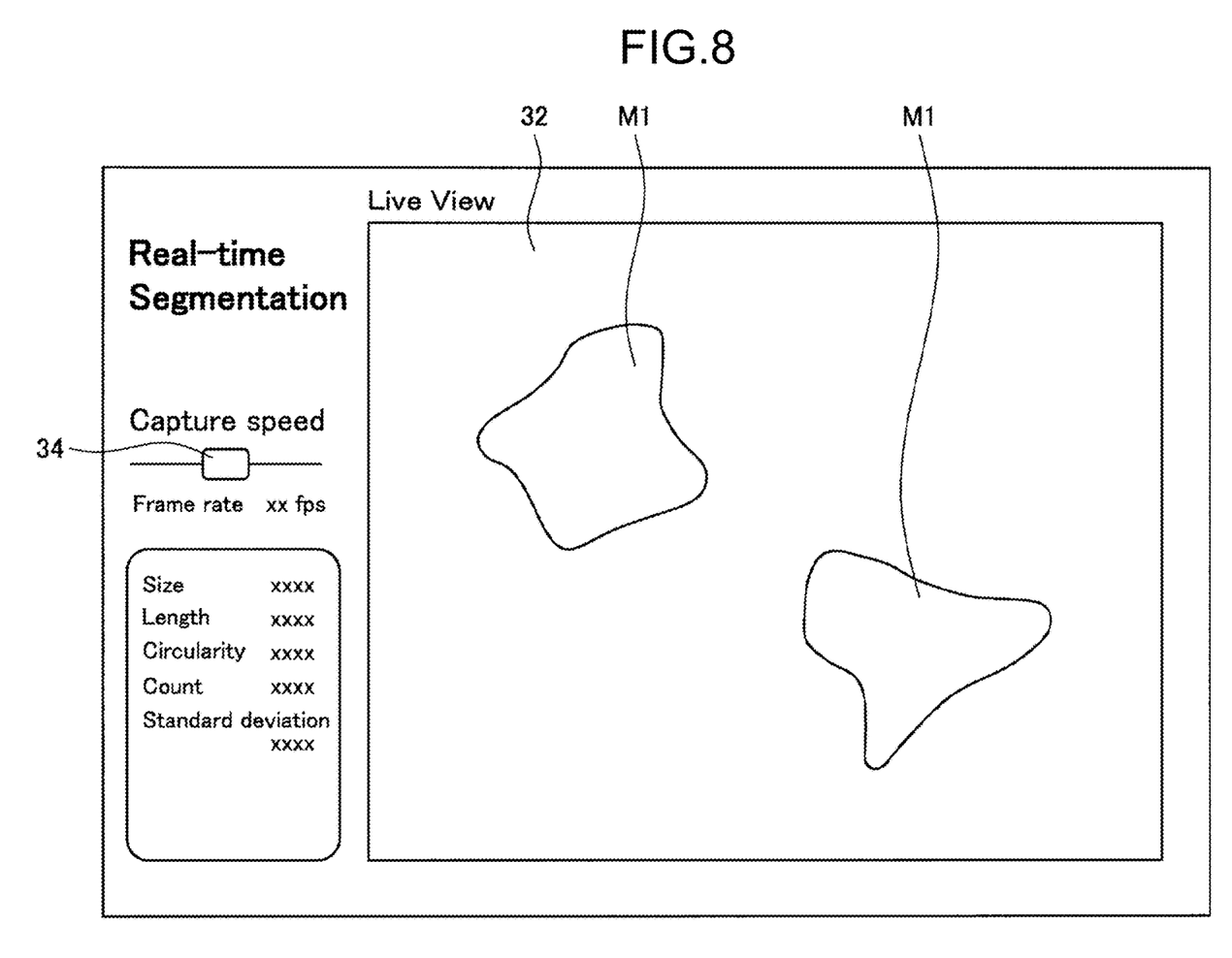
FIG. 8 is a schematic view illustrating an example of an application for real-time object detection.

FIG. 8 is a schematic view illustrating an example of the application for real-time object detection. FIG. 8 illustrates a state in which the observation target M1 is displayed on a display screen 32 of the display device 30. For example, FIG. 8 illustrates an example in which the display device 30 is configured by using a touch panel, and the capture speed may be changed by sliding an operating button 34.

When the observation target M1 is a moving cell, the discrimination processing unit 320 of the detection unit 300 performs the process to discriminate the object present in each of the windows 400 as to whether it is a cell or a background. Thus, as illustrated in FIG. 8, the outline of the cell, which is the observation target M1, is detected in real time.

In the case of the real-time object detection, the processing load may be predicted based on the capture speed and the screen size. For this reason, the detection speed at which the discrimination processing unit 320 detects whether it is a cell or a background is changed in accordance with the capture speed. For example, as the capture speed becomes higher, the detection speed may be changed to be doubled, quadrupled, or the like, in accordance with the capture speed. The detection speed may be determined in accordance with the amount of decimation, and as the amount of decimation by the sub-window decimation processing unit 314 is larger, it may be faster. In accordance with the detection speed, the sub-window decimation processing unit 314 increases the amount of decimation as the detection speed becomes faster. Further, as the detection speed becomes slower, the amount of decimation becomes smaller; thus, the image quality of the image may be enhanced. Thus, it is possible to optimally adjust the amount of decimation by the sub-window decimation processing unit 314 in accordance with the discrimination mode in which the detection speed is emphasized or the image quality is emphasized.

There is a method for tracking and displaying an object based on the feature of the shape of the object when the object is displayed in real time. However, in the technique using tracking, when the shape of an object such as a cell is changed, the tracking itself is difficult, and the real-time detection on the region of the dynamically moving object is not possible. Therefore, to detect particularly an object having a variable region, it is desirable to use the discriminator obtained by the learning as in the present embodiment. The processing load is increased if the object detection is performed every time the capture speed is increased; however, if the processing load is reduced by using the technique according to the present embodiment, the object detection with high real-time performance is possible. Thus, the present embodiment is advantageous in the case where an object (e.g., a cell such as a sperm) moving and changing in size or motion is detected in real time, displayed on the screen, and observed.

As described above, according to the present embodiment, as the window 400 is divided and the pixel value is decimated for each of the sub-windows 402, 404, and 406, the processing load on the generation of the histogram 500 may be reduced, and a further increase in the speed of the feature value detection may be achieved. In this case, as the input image itself is not reduced, it is possible to obtain an image with higher accuracy as compared with that in the detector that performs a reduction process. Further, even when the frame rate is changed, it is possible to perform processing without reducing the capture size.

While the preferred embodiment of the present disclosure is described above in detail with reference to the accompanying drawings, the technical scope of the present disclosure is not limited to the above example. It is apparent to those skilled in the art of the present disclosure that various modifications and variations may be made within the scope of the technical idea described in the claims, and it is understood that they naturally belong to the technical scope of the present disclosure.

Furthermore, the advantage described in this description is merely for purposes of description or illustration and not limitation. That is, the technique according to the present disclosure may have other advantages apparent to those skilled in the art from this description in addition to or in place of the advantage described above.

Furthermore, the following configuration also belongs to the technical range of the present disclosure.

(1)

An image processing apparatus comprising: a dividing unit that divides a detection region for detecting a feature value of an image into a plurality of regions;
a decimation processing unit that performs a decimation process on a pixel value for each of the regions; and a histogram calculating unit that interpolates a pixel value having undergone the decimation process to calculate a histogram of pixel values of the regions.

(2)

The image processing apparatus according to (1), wherein the decimation processing unit performs the decimation process such that the outer region of the detection region has a larger decimation amount for the decimation process.

(3)

The image processing apparatus according to (1) or (2), wherein the dividing unit divides the detection region into the regions that are concentric with respect to a center of the detection region.

(4)

The image processing apparatus according to (3), wherein the decimation processing unit performs the decimation process such that, with regard to the concentric regions, the outer concentric region has a larger decimation amount for the decimation process.

(5)

The image processing apparatus according to any one of (1) to (4), wherein the histogram calculating unit interpolates the pixel value having undergone the decimation process with a pixel value of a pixel adjacent to a pixel having undergone the decimation process.

(6)

The image processing apparatus according to any one of (1) to (5), further comprising a discrimination processing unit that discriminates a feature of an image of the detection region based on the histogram.

(7)

The image processing apparatus according to (6), wherein the discrimination processing unit discriminates an image of the detection region based on a discriminator that has classified an image feature obtained by learning.

(8)

The image processing apparatus according to (7), wherein the dividing unit executes division into the regions in accordance with a region division for calculating a histogram of pixel values of a learning image during the learning.

(9)

The image processing apparatus according to (6), wherein the decimation processing unit changes the decimation amount for the decimation process in accordance with a discrimination mode for discriminating a feature of the image.

(10)

An image processing method comprising:

dividing a detection region for detecting a feature value of an image into a plurality of regions;

performing a decimation process on a pixel value for each of the regions; and interpolating a pixel value having undergone the decimation process to calculate a histogram of pixel values of the regions.

(11)

A program causing a computer to function as:

a means that divides a detection region for detecting a feature value of an image into a plurality of regions;

a means that performs a decimation process on a pixel value for each of the regions; and a means that interpolates a pixel value having undergone the decimation process to calculate a histogram of pixel values of the regions.

REFERENCE SIGNS LIST

300 DETECTION UNIT
312 WINDOW DIVIDING UNIT
314 SUB-WINDOW DECIMATION PROCESSING UNIT
316 HISTOGRAM CALCULATION INTERPOLATION PROCESSING UNIT

The invention claimed is:

1. An image processing apparatus comprising:
circuitry configured to function as:
a dividing unit that divides a detection region for detecting a feature value of an image into a plurality of regions;
a decimation processing unit that performs a decimation process on a pixel value for each of the regions; and
a histogram calculating unit that interpolates a pixel value having undergone the decimation process to calculate a histogram of pixel values of the regions.

2. The image processing apparatus according to claim 1, wherein the decimation processing unit performs the decimation process such that the outer region of the detection region has a larger decimation amount for the decimation process.

3. The image processing apparatus according to claim 1, wherein the dividing unit divides the detection region into the regions that are concentric with respect to a center of the detection region.

4. The image processing apparatus according to claim 3, wherein the decimation processing unit performs the decimation process such that, with regard to the concentric regions, the outer concentric region has a larger decimation amount for the decimation process.

5. The image processing apparatus according to claim 1, wherein the histogram calculating unit interpolates the pixel value having undergone the decimation process with a pixel value of a pixel adjacent to a pixel having undergone the decimation process.

6. The image processing apparatus according to claim 1, further comprising a discrimination processing unit that discriminates a feature of an image of the detection region based on the histogram.

7. The image processing apparatus according to claim 6, wherein the discrimination processing unit discriminates an image of the detection region based on a discriminator that has classified an image feature obtained by learning.

8. The image processing apparatus according to claim 7, wherein the dividing unit executes division into the regions in accordance with a region division for calculating a histogram of pixel values of a learning image during the learning.

9. The image processing apparatus according to claim 6, wherein the decimation processing unit changes the decimation amount for the decimation process in accordance with a discrimination mode for discriminating a feature of the image.

10. An image processing method comprising:
dividing a detection region for detecting a feature value of an image into a plurality of regions;
performing a decimation process on a pixel value for each of the regions; and
interpolating a pixel value having undergone the decimation process to calculate a histogram of pixel values of the regions.

11. A non-transitory storage medium encoded with instructions that, when executed by a computer, execute processing comprising:
dividing a detection region for detecting a feature value of an image into a plurality of regions;
performing a decimation process on a pixel value for each of the regions; and interpolating a pixel value having undergone the decimation process to calculate a histogram of pixel values of the regions.

* * * * *